US012737869B2

(12) United States Patent
Shin et al.

(10) Patent No.: US 12,737,869 B2
(45) Date of Patent: Sep. 15, 2026

(54) SEMICONDUCTOR YIELD PREDICTION METHOD AND APPARATUS

(71) Applicant: SAMSUNG ELECTRONICS CO., LTD., Suwon-si (KR)

(72) Inventors: Taesoo Shin, Suwon-si (KR); Seulgi Ok, Suwon-si (KR); Kibum Lee, Suwon-si (KR); Sungwook Hwang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 245 days.

(21) Appl. No.: 18/486,350

(22) Filed: Oct. 13, 2023

(65) Prior Publication Data

US 2024/0135523 A1 Apr. 25, 2024

(30) Foreign Application Priority Data

Oct. 18, 2022 (KR) ........................ 10-2022-0134471
Mar. 3, 2023 (KR) ........................ 10-2023-0028750

(51) Int. Cl.
*G06T 7/00* (2017.01)

(52) U.S. Cl.
CPC .. *G06T 7/0004* (2013.01); *G06T 2207/30148* (2013.01)

(58) Field of Classification Search
CPC ........ G06T 7/0004; G06T 2207/30148; G05B 2219/32194; G05B 19/41875; G05B 2219/45031; H01L 22/14; H01L 22/20; H01L 21/67276; H01L 21/67253
USPC .......................................................... 382/149
See application file for complete search history.

(56) References Cited

U.S. PATENT DOCUMENTS 7,174,521 B2 2/2007 Stine et al.
10,430,719 B2 10/2019 David
2007/0211932 A1* 9/2007 Lee ....................... G06T 7/0004 382/145

(Continued)

FOREIGN PATENT DOCUMENTS

CN 110727247 A * 1/2020 ....... H01L 21/67242
CN 114156194 3/2022

(Continued)

OTHER PUBLICATIONS

Shin, et al., "The First Study of Local Defocus Automatic Control System for Industry4.0 of Semiconductor Manufacturing", in The 22nd International Conference on Control, Automation and Systems (ICCAS 2022) BEXCO, Busan, Korea, Nov. 27-Dec. 1, 2022, 2 pages.

(Continued)

*Primary Examiner* — Jennifer Mehmood
*Assistant Examiner* — Heath E. Wells
(74) *Attorney, Agent, or Firm* — Morgan, Lewis & Bockius LLP

(57) ABSTRACT

A method of predicting a semiconductor yield includes receiving wafer level data generated by measuring a plurality of wafers, generating a plurality of virtual chips corresponding to the plurality of wafers based on the wafer level data, mapping a test result of the plurality of wafers to the plurality of virtual chips, computing a defect rate of the plurality of virtual chips according to defects based on a result of the mapping, and computing a defect index of the equipment based on the defect rate.

18 Claims, 15 Drawing Sheets

(56) References Cited

U.S. PATENT DOCUMENTS

| | | | | |
|---|---|---|---|---|
| 2013/0080125 | A1 * | 3/2013 | Baseman | G05B 17/02 703/2 |
| 2015/0253373 | A1 * | 9/2015 | Callegari | G01R 31/2601 702/58 |
| 2017/0228866 | A1 * | 8/2017 | Jain | H10P 74/23 |
| 2017/0242070 | A1 * | 8/2017 | Giotta | G01R 31/30 |
| 2018/0197714 | A1 * | 7/2018 | Plihal | G01N 21/9501 |
| 2020/0004921 | A1 * | 1/2020 | Baidya | G06N 5/022 |
| 2020/0371441 | A1 | 11/2020 | Tel et al. | |
| 2021/0232745 | A1 | 7/2021 | Chou et al. | |
| 2022/0011728 | A1 | 1/2022 | Zhang et al. | |
| 2022/0128911 | A1 | 4/2022 | Park et al. | |
| 2022/0390506 | A1 * | 12/2022 | Price | G01R 31/2831 |
| 2023/0160960 | A1 * | 5/2023 | Song | G01R 31/318511 324/762.05 |
| 2023/0305055 | A1 * | 9/2023 | Chung | G01R 31/2896 |
| 2024/0387295 | A1 * | 11/2024 | Sendoda | G05B 19/41875 |

FOREIGN PATENT DOCUMENTS

| | | |
|---|---|---|
| KR | 10-2007-0070903 A | 7/2007 |
| KR | 10-1474611 | 12/2014 |
| KR | 10-2022-0114258 | 8/2022 |

OTHER PUBLICATIONS

First Office Action issued May 20, 2026 in corresponding Korean Patent Application No. 10-2023-0028750.

* cited by examiner

| Radius | Theta |
|---|---|
| 140~146.5 | 84~96 |
| 140~146.5 | 194~200 |
| 140~146.5 | 340~346 |

| Radius | Theta |
|---|---|
| 122.5~129 | 88~92 |
| 122.5~129 | 208~212 |
| 122.5~129 | 328~332 |

SEMICONDUCTOR YIELD PREDICTION METHOD AND APPARATUS

CROSS-REFERENCE TO RELATED APPLICATION

This application is based on and claims priority under 35 U.S.C. § 119 to Korean Patent Application Nos. 10-2022-0134471, filed on Oct. 18, 2022, and 10-2023-0028750, filed on Mar. 3, 2023, in the Korean Intellectual Property Office, the disclosure of which is incorporated by reference herein in their entireties.

BACKGROUND

The inventive concept relates to a semiconductor yield prediction method and apparatus, and more particularly, to a method and apparatus for predicting a semiconductor yield through defect detection of a wafer.

A semiconductor wafer may be contaminated due to foreign substances, such as particles, while undergoing several processes, and such defects may influence the defect rate of a semiconductor chip. For example, while undergoing a photo process, the surface of a wafer may rise due to pressure applied between the wafer and a chuck, thereby causing hot spots to occur. If the size of a hot spot deviates from a depth of focus (DOF), a pattern may not be normally formed, thereby causing defocus to occur. This defocus may occur on both the frontside and backside of a wafer, and accordingly, the productivity and quality of a semiconductor product may decrease and the yield may also decrease.

SUMMARY

The inventive concept relates to predicting yield and improving the quality and productivity by monitoring a process and/or equipment through early detection of a wafer defect.

According to an aspect of the inventive concept, there is provided a method of predicting a semiconductor yield, the method including receiving wafer level data generated by measuring a plurality of wafers, generating a plurality of virtual chips corresponding to real chips of the plurality of wafers based on the wafer level data, mapping a test result of the plurality of wafers to the plurality of virtual chips, computing a defect rate of the plurality of virtual chips according to defects based on a result of the mapping, and computing a defect index based on the defect rate.

According to another aspect of the inventive concept, there is provided a method of predicting a semiconductor yield, the method including receiving wafer level data generated by measuring each of a plurality of wafers, generating a plurality of virtual chips corresponding to real chips of each of the plurality of wafers based on the wafer level data, mapping a test result of each of the plurality of wafers to the plurality of virtual chips, receiving fixed areas of equipment, transforming a coordinate system of the plurality of virtual chips to match the transformed coordinate system to a coordinate system of the fixed areas, computing a defect rate of each of the plurality of virtual chips overlapping the fixed areas, according to defects based on a result of the mapping, and computing a defect index of the equipment based on the defect rate.

According to another aspect of the inventive concept, there is provided an apparatus including a memory in which a program for predicting a semiconductor yield is stored, and a processor configured to execute the program stored in the memory, wherein the processor is further configured to receive wafer level data generated by measuring each of a plurality of wafers, generate a plurality of virtual chips corresponding to real chips of each of the plurality of wafers based on the wafer level data, map a test result of each of the plurality of wafers to the plurality of virtual chips, compute a defect rate of each of the plurality of virtual chips according to defects based on a result of the mapping, and compute a defect index based on the defect rate.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments are described in detail with reference to the accompanying drawings.

Figure 1:
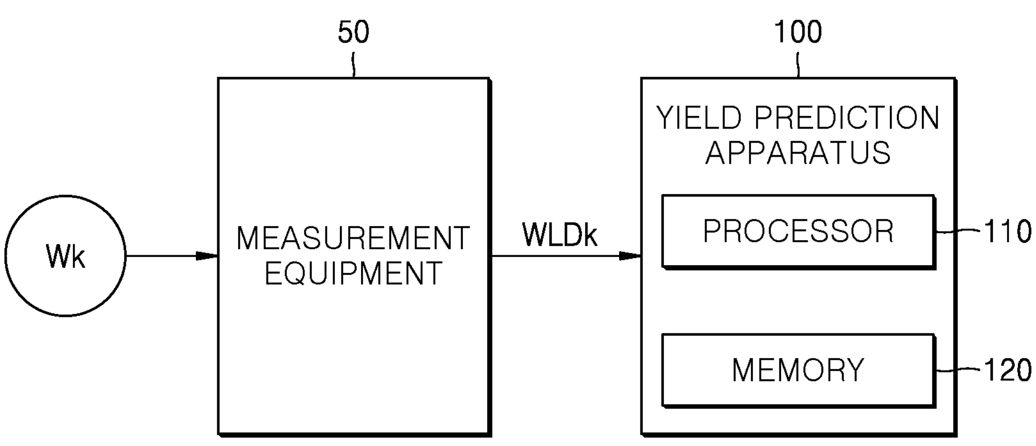
FIG. 1 is a block diagram schematically illustrating a yield prediction system, according to an embodiment.

FIG. 1 is a block diagram schematically illustrating a yield prediction system, according to an embodiment.

Referring to FIG. 1, measurement equipment 50 may receive a semiconductor wafer Wk and measure various kinds of information about the semiconductor wafer Wk. For example, the measurement equipment 50 may detect defects of the semiconductor wafer Wk (e.g., hot spots on the frontside and/or the backside of the semiconductor wafer Wk). The defects may be associated with a level of the semiconductor wafer Wk. In a process of manufacturing a semiconductor wafer, a process (e.g., a photo process) may be performed on the semiconductor wafer several times. The photo process may be referred to as photolithography or a photolithography process. The semiconductor wafer may be contaminated due to particles caused by friction and vibration, foreign substances, and the like while undergoing each process. Accordingly, various levels of the semiconductor wafer may be present. Hereinafter, for convenience of description, a process performed on a semiconductor wafer may be assumed as a photo process.

The semiconductor wafer Wk may indicate a wafer having undergone a photo process of a kth step (herein, k≥0) (k=0, indicates a wafer on which no photo process has been performed) among several photo processes to be performed on a semiconductor wafer. A plurality of defects described above may exist on the semiconductor wafer Wk.

The measurement equipment 50 may measure defects of a semiconductor wafer whenever a photo process on the semiconductor wafer is finished, i.e., for each process step, as to be particularly described below. In some embodiments, the measurement equipment 50 may measure the semiconductor wafer Wk subsequent to the photo process of the kth step, and as a result of the measurement, the measurement equipment 50 may generate wafer level data (WLD) corresponding to the photo process of the kth step (WLDk). The measurement equipment 50 may provide the generated wafer level data for the kth step WLDk to a yield prediction apparatus 100. The measurement equipment 50 may be referred to as a photo level sensor or photo level measurement equipment. In some embodiments, because the measurement equipment 50 measures the semiconductor wafer Wk, then generates the wafer level data WLDk, and provides the wafer level data WLDk to the yield prediction apparatus 100 in response to the completion of each photo process, when the photo process of the mth step is finished, all of wafer level data from the first step WLD1 to wafer level data of the mth step WLDm may be stored in the yield prediction apparatus 100 (see FIG. 6).

The wafer level data WLDk may include data of defects detected from the semiconductor wafer Wk, where the measurement equipment 50 can be configured to detect the semiconductor wafer defects. The wafer level data WLDk may be referred to as a wafer level map. The wafer level data WLDk of defects may include the position, height, size of each defect, and step information about a process performed on the semiconductor wafer Wk. As processes progress, an index, that can indicate information about a process step corresponding to a corresponding process, may be incremented (increase). For example, a third process may be a process performed temporally later than a first process. Therefore, an index of a step corresponding to a third process (information about a third process step) may be greater than an index of a step corresponding to a first process (information about a first process step).

The yield prediction apparatus 100 may be a system configured for executing a method of predicting a yield, according to an embodiment. The yield prediction apparatus 100 may perform a data preprocessing operation, as to be described below, by using the data relating to detected defects, which is included in the wafer level data WLDk. In some embodiments, a plurality of semiconductor wafers may be measured for yield prediction according to an embodiment. The yield prediction apparatus 100 may compute a defect rate (also referred to as a killing ratio) through a statistical analysis based on data obtained by performing the data preprocessing operation on the plurality of semiconductor wafers. In addition, for the yield prediction, the yield prediction apparatus 100 may compute a defect index (also referred to as a failed chip count (FCC)) by using the defect rate. The yield prediction apparatus 100 may predict the yield of the entire area of the semiconductor wafer Wk, and/or the yield of fixed areas corresponding to semiconductor equipment based on preprocessed data. In addition, the yield prediction apparatus 100 may determine a defect rate of the semiconductor equipment and whether the semiconductor equipment is defective, based on an algorithm according to an embodiment.

The yield prediction apparatus 100 may include a processor 110 and a memory 120. For example, the yield prediction apparatus 100 may be a computing system, such as a personal computer, a mobile phone, or a server, a module having a plurality of processing cores and memories mounted as independent packages on a substrate, or a system on chip (SoC) having a plurality of processing cores and memories embedded in one chip.

The processor 110 may execute instructions through the memory 120. In some embodiments, the processor 110 may execute a program stored in the memory 120. For example, the processor 110 may execute the program for performing a yield prediction method according to an embodiment, where the yield prediction program is stored in the memory 120, to predict the yield of a wafer. The program may include a series of instructions to be executed by the processor 110. The processor 110 may include hardware, which may independently execute the instructions and may be referred to as an application processor (AP), a communication processor (CP), a central processing unit (CPU), a process core, a core, or the like.

The processor 110 may communicate with the memory 120. The memory 120 may be accessed by the processor 110 and store software executable by the processor 110. The software may include, as a non-limiting example, a software component, a program, an application, a computer program, an application program, a system program, a software development program, a machine program, operating system (OS) software, middleware, firmware, a software module, a routine, a subroutine, a function, a method, a procedure, a software interface, an application program interface (API), a command set, computing code, computer code, a code segment, a computer code segment, a word, a value, a symbol, or an arbitrary combination of two or more thereof.

The memory 120 may be arbitrary hardware which may store information and is accessible by the processor 110. For example, the memory 120 may include read-only memory (ROM), random access memory (RAM), dynamic random access memory (DRAM), double-data-rate dynamic random access memory (DDR-DRAM), synchronous dynamic random access memory (SDRAM), static random access memory (SRAM), magnetoresistive random access memory (MRAM), programmable read only memory (PROM), erasable programmable read-only memory (EPROM), electrically erasable programmable read-only memory (EEPROM), flash memory, a polymer memory, phase change memory, ferroelectric memory, silicon-oxide-nitride-oxide-silicon (SONOS) memory, a magnetic card/disk, an optical card/disc, or arbitrary combination of two or more thereof.

Figure 2:
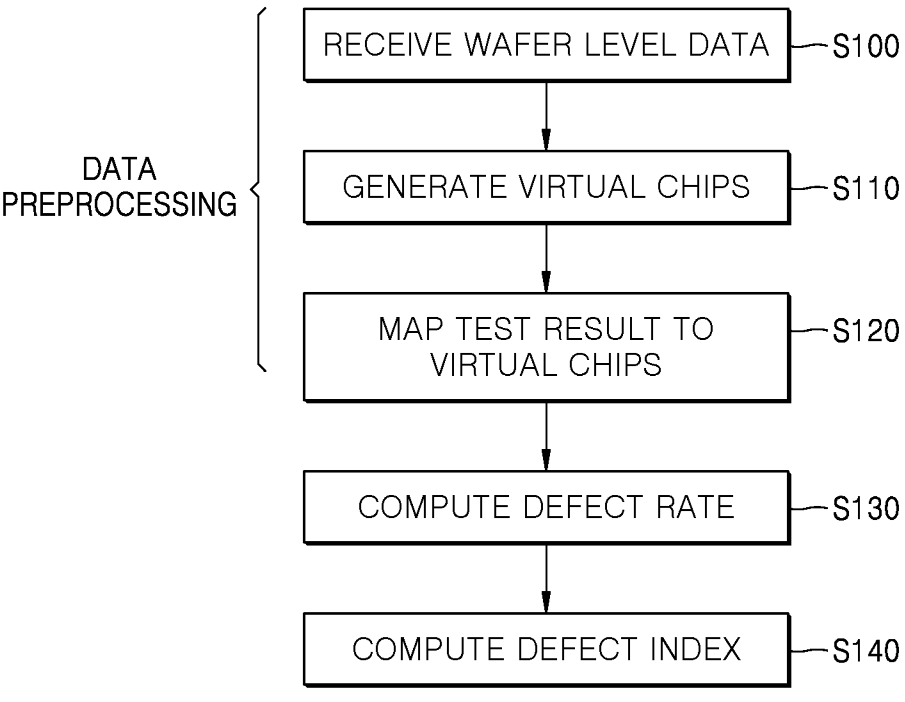
FIG. 2 is a flowchart illustrating a method of predicting the yield of the entire area of a wafer, according to an embodiment.

FIG. 2 is a flowchart illustrating a method of predicting the yield of the entire area of a wafer, according to an embodiment.

Referring to FIG. 2, the yield prediction method according to an embodiment may include operation S100 of receiving wafer level data, operation S110 of generating a plurality of virtual chips, operation S120 of mapping a test result to the plurality of virtual chips, operation S130 of computing a defect rate (or killing ratio), and operation S140 of computing a defect index.

As described above with reference to FIG. 1, in operation S100, the yield prediction apparatus 100 may receive the wafer level data WLDk from the measurement equipment 50. The wafer level data WLDk may include information (hereinafter, referred to as defect data) about the positions, sizes, heights, and other aspects of defects.

In some embodiments, to identify an influence exerted on a chip by defects on the backside of the semiconductor wafer Wk, data (e.g., virtual chips) corresponding to real chips may be used. Although real chips may not exist on the backside of the semiconductor wafer Wk, the data representing the backside of the semiconductor wafer Wk may be utilized to determine the effect of such defects.

In operation S110, the yield prediction apparatus 100 may generate a plurality of virtual chips respectively corresponding to real chips based on the wafer level data WLDk. In some embodiments, when generating a virtual area, as to be described below with reference to FIG. 3, the yield prediction apparatus 100 may segment the virtual area into standardized chip units based on the wafer level data WLDk of the semiconductor wafer Wk and generate a plurality of virtual chips respectively corresponding to real chips.

In operation S120, the yield prediction apparatus 100 may map a test result to the generated plurality of virtual chips. For example, as to be described below with reference to FIG. 5, the yield prediction apparatus 100 may map a result of an electric die sorting (EDS) test to the plurality of virtual chips. In some embodiments, the EDS test result may include information about whether a chip has passed certain criteria (i.e., a result about whether the chip is defective) by testing a real chip. Operation S100 of receiving wafer level data, operation S110 of generating a plurality of virtual chips, and operation S120 of mapping a test result to the plurality of virtual chips may be referred to as a data preprocessing operation. The yield prediction apparatus 100 may obtain data for a statistical analysis by performing the data preprocessing operation on a plurality of semiconductor wafers, where wafer level data WLDk can be collected for each of the plurality of semiconductor wafers. Particularly, the yield prediction apparatus 100 may obtain defect data included in each of the plurality of virtual chips and data about whether each virtual chip corresponding to the defect data is defective, for the plurality of semiconductor wafers.

In operation S130, the yield prediction apparatus 100 may compute a defect rate of each of the plurality of virtual chips based on defect information of the wafer level data WLDk and the plurality of virtual chips to which the test result is mapped. In other words, the yield prediction apparatus 100 may identify a correlation between defects and failure based on preprocessed data for the plurality of semiconductor wafers. The yield prediction apparatus 100 may compute, from the plurality of semiconductor wafers, a defect rate of a virtual chip containing defect data according to a defect aspect (e.g., the size of the defect) by mapping an EDS test result of a real chip corresponding to the virtual chip to the virtual chip. For example, the greater the size of a defect included in a virtual chip, the greater the degree of contamination due to particles and the like, and thus, as a test result of a real chip, the possibility that it is determined that the real chip is defective may increase. The yield prediction apparatus 100 may predict the possibility that a real chip is defective according to a defect through the defect rate computation. In some embodiments, to reflect a characteristic that the possibility that a real chip is defective increases according to an increase in the size of a defect, fitting (or modeling or optimization) of the defect rate may be performed using, for example, a least square method. That is, fitting data obtained from several samples may be performed to accurately reflect a correlation between the size of a defect and whether a chip is defective.

In operation S140, the yield prediction apparatus 100 may compute a defect index based on the defect rate to predict a semiconductor yield according to defects. The defect index may be computed by Equation 1 below by dividing the total sum of bad chips computed based on a defect rate by production in a process.

$$\text{Defect index} = \frac{\sum_{a \in \Omega} K(\text{Max}_{x \in a}(m_s(x)))}{\text{Production in a process}} \quad \text{[Equation 1]}$$

where a denotes a chip positioned in a wafer Ω, K(y) denotes a defect rate (%) of a defect y obtained from wafer level data (i.e., computed based on mapping), and $\text{Max}_{x \in a}(m_s(x))$ denotes the size of the defect y positioned at a position x in the chip a. That is, the defect index may be computed based on the defect rate according to the size of the defect y at the position x existing in the chip a.

As a result, by using the yield prediction method according to an embodiment, a bad chip due to a defect may be detected earlier in a fabrication (FAB) operation, and the yield in the process may be predicted through the detection. The inventive concept may be applied to the frontside of a wafer and particularly, the yield according to defects of the backside of the wafer may also be predicted. Therefore, detection and prediction of defects of the frontside and/or backside of a wafer may be quantized and reinforced.

Furthermore, an EDS test result may be used as a defect index to improve the coherence between defects and yield prediction. In addition, an improved effect of equipment (i.e., yield) may be identified in a manufacturing operation not after FAB OUT, and furthermore, detection delay may be prevented through early detection, and thus, the inventive concept may contribute to yield improvement and productivity improvement.

Also, a process-based and equipment-based control process may be established and standardized according to defects of a wafer, thereby reducing cost and waste in human and time resources and the like, and reducing a deviation in improvement according to a user's competence.

Figure 3:
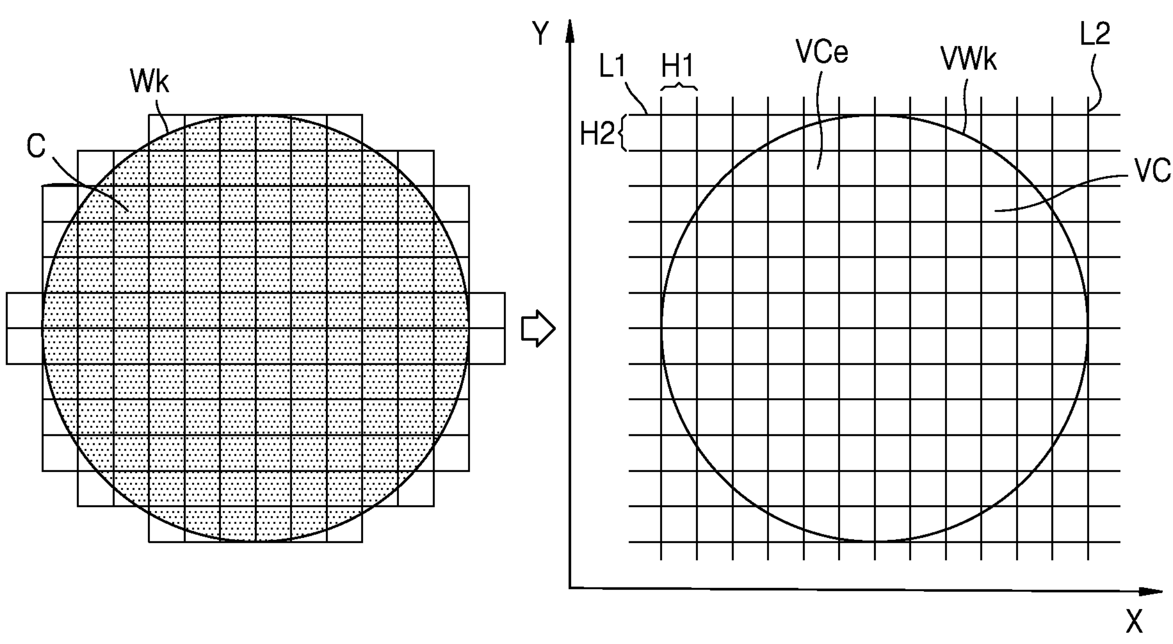
FIG. 3 illustrates a process of generating a plurality of virtual chips, according to an embodiment.

FIG. 3 illustrates a process of generating a plurality of virtual chips, according to an embodiment.

Referring to FIGS. 1 and 3, the yield prediction apparatus 100 may generate a plurality of virtual chips VC based on the semiconductor wafer Wk including real chips C, where for example, the virtual chips VC may be included in a virtual wafer VWk. Because information about real chips of the semiconductor wafer Wk is included in the wafer level data WLDk generated through measurement, the virtual chips VC may be generated to correspond to the real chips C based on the information. There can be a one-to-one correlation between a real chip C and a virtual chip VC.

More particularly, the yield prediction apparatus 100 may generate the virtual chips VC in a grid form based on information about the positions of outermost real chips of the wafer level data WLDk. In some embodiments, the yield prediction apparatus 100 may generate a top grid line L1 as shown in FIG. 3, based on the information about the positions of the outermost real chips, where the top grid line L1 can be tangential to an edge of the virtual wafer VWk. For example, the yield prediction apparatus 100 may generate grid lines with intervals of a segment length H2 in a second direction Y from the top grid line L1 based on the length H2 of the real chip C in the second direction Y, which is obtained from the wafer level data WLDk. Likewise, the yield prediction apparatus 100 may generate a grid line L2 at the outermost position in a first direction X that is perpendicular to the second direction Y, based on the information about the positions of the outermost real chips, where the grid line L2 can be tangential to the edge of the virtual wafer VWk. For example, the yield prediction apparatus 100 may generate grid lines with intervals of a segment length H1 in the first direction X from the grid line L2 based on the length H1 of the real chip C in the first direction X, which is obtained from the wafer level data WLDk. By doing this, the yield prediction apparatus 100 may generate coordinates in a grid form and generate the virtual chips VC standardized to correspond to the real chips C.

In some embodiments, as to be described below with reference to FIG. 4, based on the coordinates in a grid form, rectangular coordinates may be set for an area including the virtual chips VC. In addition, in some embodiments, each of the virtual chips VC may have chip coordinates with the length H1 as a unit in the first direction X and the length H2 as a unit in the second direction Y. For example, as to be described below with reference to FIG. 5, the chip coordinates of a virtual chip VCe at the uppermost and leftmost position may be represented by (WC1, WR1).

Figure 4:
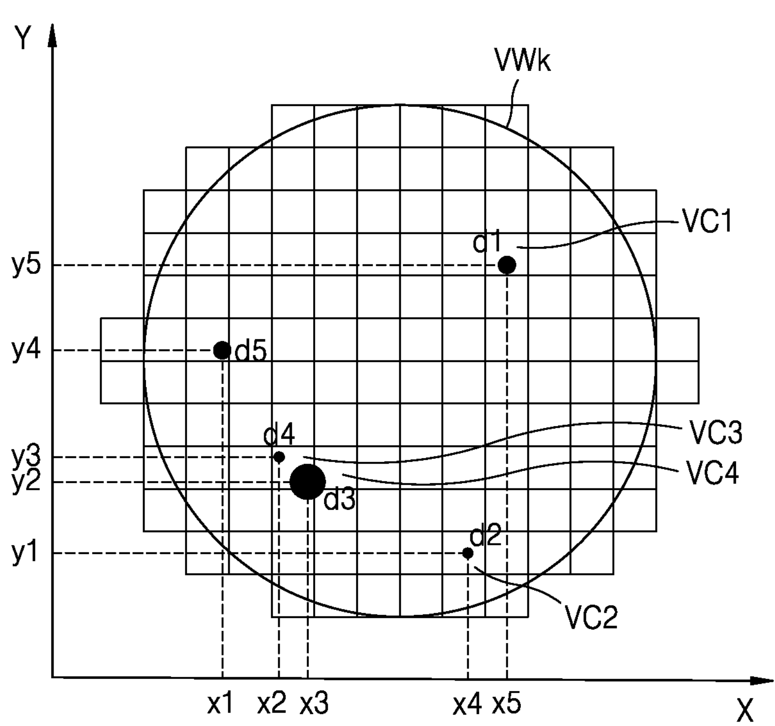
FIG. 4 illustrates virtual chips including defect data, according to an embodiment.

FIG. 4 illustrates virtual chips including defect data, according to an embodiment.

Referring to FIGS. 1 and 4, the yield prediction apparatus 100 may generate a plurality of virtual chips including a first virtual chip VC1, a second virtual chip VC2, a third virtual chip VC3, and a fourth virtual chip VC4, generate coordinates in a grid form, and reflect defect data to the plurality of virtual chips based on the wafer level data WLDk. For example, the plurality of virtual chips VC1, VC2, VC3, VC4 may include a plurality of defects d1 to d5, but the present embodiment is not limited thereto. That is, the positions, heights, and/or sizes of defects included in virtual chips, the number and distribution of the defects, and the like may be formed in various aspects.

In some embodiments, as shown in FIG. 4, the defect d5 may be positioned at (x1, y4) in a rectangular coordinate system and have a particular size and height. The defect d1 may be positioned at (x5, y5) in the rectangular coordinate system, have a particular size and height, and be included in the first virtual chip VC1. The yield prediction apparatus 100 may map a test result to the first virtual chip VC1 to identify a correlation between the defect d1 and whether an actual chip is defective. That is, the yield prediction apparatus 100 may compute a defect rate of a virtual chip according to a defect based on data of the defect dl included in the first virtual chip VC1 and the test result mapped to the first virtual chip VC1. The greater the size of a defect, the greater the degree of contamination, and thus, the greater the possibility that an actual chip is determined to be defective, as an EDS test result may increase. For example, the defect d2 may be positioned at (x4, y1) in the rectangular coordinate system, have a particular size and height, and be included in the second virtual chip VC2. The yield prediction apparatus 100 may map a test result to the second virtual chip VC2 to identify a correlation between the defect d2 and whether an actual chip is defective. Herein, as shown in FIG. 4, the defect d1 may have a relatively larger size than the defect d2. Therefore, as described above, a defect rate (%) of the first virtual chip VC1 including the defect d1 having a larger size may be higher than a defect rate of the second virtual chip VC2 including the defect d2. When defect rates are computed by generating a plurality of virtual chips for each of a plurality of semiconductor wafers, such a correlation may be vivid. Accordingly, the yield prediction apparatus 100 may compute a defect rate of a corresponding virtual chip according to the size of a defect and compute a defect size-based defect rate to which a defect size characteristic is reflected.

In some embodiments, the defect d4 may be positioned at (x2, y3) in the rectangular coordinate system, have a particular size and height, and be included in the third virtual chip VC3. Likewise, the defect d3 positioned at (x3, y2) in the rectangular coordinate system and having a particular size and height may also be included in the third virtual chip VC3 Like this, a plurality of defects may be included in a single virtual chip. When computing a defect rate of a virtual chip according to the size of a defect, the yield prediction apparatus 100 may consider only a defect having the largest size if a plurality of defects are included in the virtual chip. For example, because the defects d3 and d4 are included in the third virtual chip VC3 and the size of the defect d3 is relatively greater than the size of the defect d4, only the defect d3 may be considered to compute a defect rate (%) of the third virtual chip VC3. As described above, the greater the size of a defect, the greater the degree of contamination, and thus, because the defect may exert a relatively larger influence on a test result of a real chip as the size of the defect is greater, only a defect having the greatest size among a plurality of defects may be considered for defect rate computation. In some embodiments, a defect may influence a plurality of virtual chips according to the position or size of the defect. For example, as shown in FIG. 4, the defect d3 may be included in the third virtual chip VC3 and the fourth virtual chip VC4. Therefore, when computing a defect rate of the fourth virtual chip VC4, the yield prediction apparatus 100 may compute a defect rate according to a portion of the size of the defect d3, which is included in the fourth virtual chip VC4. In some embodiments, as to be described below with reference to FIG. 5, the plurality of virtual chips including the first virtual chip VC1 to the fourth virtual chip VC4 may be represented by chip coordinates. Computing the defect rate can involve fitting the defect rate to a model, such that the greater the size of the defect, the greater the defect rate.

As a result, according to the yield prediction method according to an embodiment, a defect rate of each chip according to the size of a defect may be computed, thereby improving yield prediction and accuracy. In addition, a defect index may be computed based on the computed defect rate, thereby improving the accuracy of yield prediction.

Figure 5:
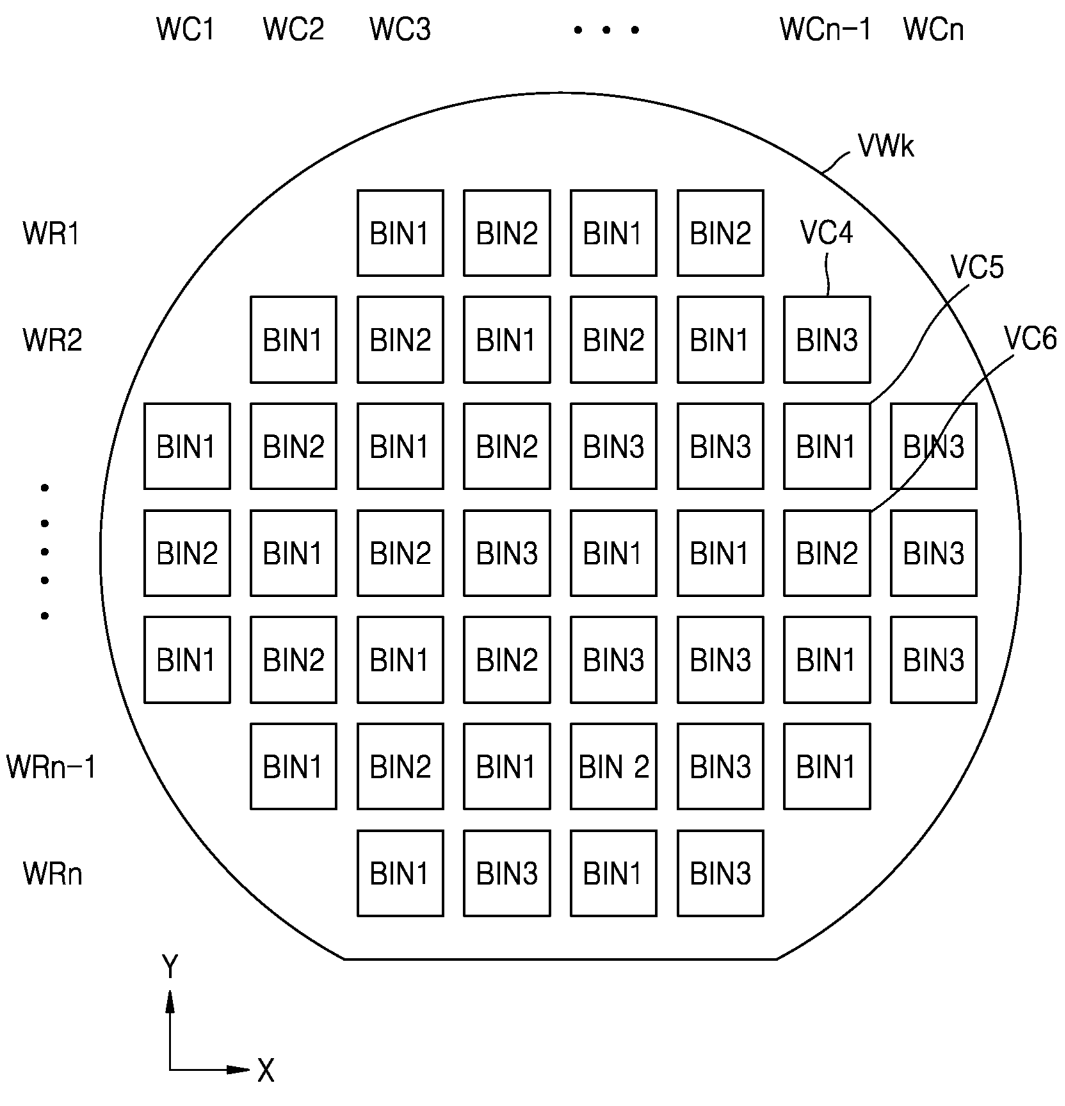
FIG. 5 illustrates virtual chips to which a test result is mapped, according to an embodiment.

FIG. 5 illustrates virtual chips to which a test result is mapped, according to an embodiment.

Referring to FIGS. 1 and 5, the yield prediction apparatus 100 may map a test result (e.g., an EDS test result) to a generated plurality of virtual chips. The test result may include information (e.g., test bin items BIN) indicating whether a corresponding chip is defective after performing an arbitrary test on each chip. That is, the yield prediction apparatus 100 may receive test bin items, e.g., first to third test bin items BIN1 to BIN3 for the plurality of virtual chips configured to correspond to real chips and identified according to chip coordinates on the virtual wafer VWk, by performing an EDS test process. The yield prediction apparatus 100 may map the first to third test bin items BIN1 to BIN3 that are a test result to the virtual wafer VWk. For example, as shown in FIG. 5, the EDS test result may be mapped to each of the plurality of virtual chips identified according to chip coordinates and including a fourth virtual chip VC4, a fifth virtual chip VC5, and a sixth virtual chip VC6.

More particularly, first, in some embodiments, the plurality of virtual chips may be formed in a grid format, as described above with reference to FIG. 3, and represented by chip coordinates based on the grid form. The plurality of virtual chips may be segmented on the virtual wafer VWk in the first direction X (e.g., row direction) and the second direction Y (e.g., column direction) perpendicular to the first direction X. The plurality of virtual chips may be arranged in the second direction Y and correspond to coordinate values WR1 to WRn (n is a natural number greater than or equal to 1), and likewise, the plurality of virtual chips may be arranged in the first direction X and correspond to coordinate values WC1 to WCn (where n is a natural number greater than or equal to 1). The plurality of virtual chips may correspond to real chips, respectively, and the number of virtual chips may be variously implemented. For example, the fourth virtual chip VC4 may be represented by chip coordinates (WCn−1, WR2), the fifth virtual chip VC5 may be represented by chip coordinates (WCn−1, WR3), and the sixth virtual chip VC6 may be represented by chip coordinates (WCn−1, WR4).

An EDS test process may be a process of testing electrical characteristics of each of respective real chips before performing a packaging process. The EDS test process may determine bad chips among the real chips, so that repairable chips are repaired and a subsequent process is not performed on non-repairable chips, thereby saving the time to be taken and the cost of production. In addition, the EDS test process may test the real chips to classify the real chips into the test bin items BIN as described above. Each of the first to third test bin items BIN1 to BIN3 may indicate one of the possible defect (or error) types categorized from an EDS test result. In other words, the test bin items BIN may indicate error types obtained by classifying EDS test result values into the possible types. For example, the first to third test bin items BIN1 to BIN3 may be electrical characteristic items used to test the real chips. Each of the first to third test bin items BIN1 to BIN3 of the EDS test process may correspond to at least one item related to a voltage input-output characteristic, a current input-output characteristic, a leakage characteristic, a functionality characteristic, and a timing characteristic of individual devices (transistors, resistors, capacitors, diodes, and the like) required for an operation of an integrated circuit (IC) constituting a chip. In the EDS test process, a test may be performed to classify the electrical characteristic items, as described above, where the types of defects detected through an EDS test may vary. The test result can include information about defect types of the real chips.

For example, through an EDS test, the first test bin item BIN1 may be matched to a chip having a result within a normal category and indicate that a real chip corresponding to the fifth virtual chip VC5 has passed certain criteria. For example, the second test bin item BIN2 may indicate a leakage characteristic, where if a leakage current value is greater than or equal to a reference value, this defect type may be classified as the second test bin item BIN2. That is, a real chip corresponding to the sixth virtual chip VC6 may be classified as a bad chip because a leakage current value of the real chip is greater than or equal to the reference value. In addition, for example, the third test bin item BIN3 may indicate a functionality characteristic or a timing characteristic, and if the functionality characteristic or the timing characteristic does not satisfy a certain criterion, this defect type may be classified as the third test bin item BIN3. That is, a real chip corresponding to the fourth virtual chip VC4 may be classified as a bad chip because the functionality characteristic or the timing characteristic of the real chip does not satisfy the certain criterion. In addition, for example, if a real chip corresponding to an arbitrary virtual chip has a leakage current greater than or equal to the reference value and has a timing characteristic not satisfying the certain criterion, and if the leakage current is a more representative error than the timing characteristic, a defect type of this case may be classified as the second test bin item BIN2. However, the examples described above are only for ease of description, and the inventive concept is not limited thereto. That is, although FIG. 5 shows three test bin items, i.e., the first to third test bin items BIN1 to BIN3, this is for convenience of description, and more test bin items may be used according to a test level of the EDS test process.

As a result, the yield prediction apparatus 100 may compute, in a chip unit, a defect rate indicating a correlation between a defect of a real chip corresponding to each of a plurality of virtual chips and whether the real chip is defective according to the defect by receiving an EDS test result, and mapping the EDS test result to the plurality of virtual chips. A yield can be predicted by computing a defect index. In addition, the defect index may be used based on the EDS test result to improve the coherence between defects and yield prediction.

Figure 6:
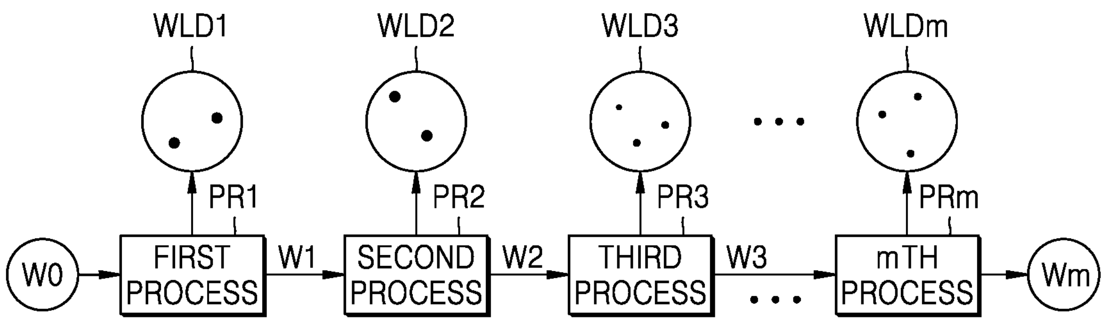
FIG. 6 illustrates a process of predicting yield for each process step, according to an embodiment.

FIG. 6 illustrates a process of predicting yield for each process step, according to an embodiment.

Referring to FIGS. 1 and 6, a plurality of processes (e.g., a photo process) may be performed on a semiconductor wafer W0. As described above, the measurement equipment 50 may generate the wafer level data WLDk by measuring the semiconductor wafer Wk on which a kth process has been performed.

Several processes may be performed on the semiconductor wafer W0. For example, referring to FIG. 6, a first process PR1 to an mth process PRm may be performed on the semiconductor wafer W0. In other words, m processes (m≥1) may be performed on the semiconductor wafer W0, where the processes may be performed in a sequence. A semiconductor wafer Wm may indicate a semiconductor wafer after undergoing all of the first process PR1 to the mth process PRm, whereas semiconductor wafer W0 can indicate a semiconductor wafer before undergoing any processes. In some embodiments, step information may indicate step information of processes performed on the semiconductor wafer Wk, i.e., information indicating how many processes have been performed. For example, the wafer level data WLDk of FIG. 1 may include data indicating that a process performed on the semiconductor wafer Wk is a kth process step. For example, because the semiconductor wafer W0 undergoes several processes in a manufacturing process, several pieces of wafer level data (e.g., first wafer level data WLD1 to mth wafer level data WLDm) may exist for one semiconductor wafer.

The measurement equipment 50 may generate wafer level data by measuring a semiconductor wafer every time a process on the semiconductor wafer W0 is completed. For example, as shown in FIG. 6, the measurement equipment 50 may generate the first wafer level data WLD1 by measuring a semiconductor wafer W1 after the first process PR1 ends. The measurement equipment 50 may generate the second wafer level data WLD2 by measuring a semiconductor wafer W2 after the second process PR2 ends. The measurement equipment 50 may generate the third wafer level data WLD3 by measuring a semiconductor wafer W3 after the third process PR3 ends. The measurement equipment 50 may generate the mth wafer level data WLDm by measuring the semiconductor wafer Wm after the mth process PRm ends. This can be the same semiconductor wafer that has undergone each processing step.

The first wafer level data WLD1 may include information (i.e., defect data) about defects measured after the first process PR1. The second wafer level data WLD2 may include information about defects measured after the second process PR2. The third wafer level data WLD3 may include information about defects measured after the third process PR3. Likewise, the mth wafer level data WLDm may include information about defects measured after the mth process PRm for the same semiconductor wafer. As shown in FIG. 6, defects included in each wafer level data may be variously implemented according to the characteristic of a corresponding process step.

In some embodiments, the defects included in the first wafer level data WLD1 may be or may not be included in subsequent wafer level data due to various kinds of semiconductor processes which may occur after the first process PR1. For example, a defect included in the first wafer level data WLD1 may not be included in the second wafer level data WLD2, but may be included in the third wafer level data WLD3.

Therefore, the yield prediction apparatus 100 may compute a defect index corresponding to each process step. As described above, because information about a process step is included in the wafer level data WLDk generated by the measurement equipment 50 based on the semiconductor wafer Wk having undergone a kth process, the yield prediction apparatus 100 may compute a defect index for each process step based on the wafer level data WLDk. The yield prediction apparatus 100 may compute the defect index for each process step by Equation 2 below by adding information about a step to the defect index computation method described above.

$$\text{Defect index} = \frac{\sum_{\substack{a\in\Omega \\ s\in\Gamma}} K(\text{Max}_{x\in a}(m_s(x)))}{\text{Production per process step}} \quad \text{[Equation 2]}$$

where a denotes the chip positioned in the wafer Ω, K(y) denotes a defect rate of the defect y obtained from wafer level data (i.e., computed based on mapping), $\text{Max}_{x\in a}(m_s(x))$ denotes the maximum size of the defect y positioned at the position x in the chip a, and s denotes a particular process step among all process steps Γ. That is, a defect index of a process step s may be computed based on a defect rate according to the size of a defect at the position x existing in the chip a in the process step s.

As a result, according to the yield prediction method according to an embodiment, the yield for each process step may be predicted through a separate defect index for each process step. In addition, a process step for which improvement is needed may be detected based on the predicted yield for each process step, thereby effectively improving yield.

Figure 7:
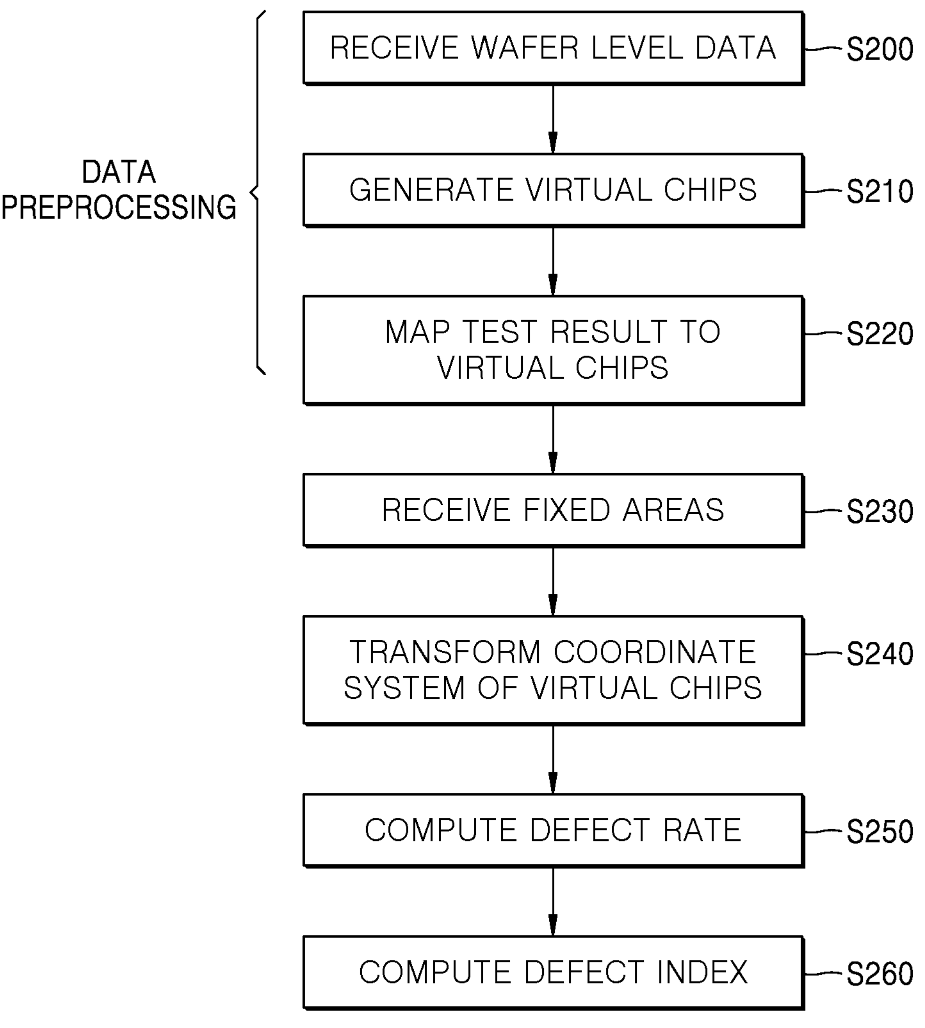
FIG. 7 is a flowchart illustrating a method of predicting yield related to fixed areas for each piece of equipment, according to an embodiment.

FIG. 7 is a flowchart illustrating a method of predicting yield related to fixed areas for each piece of equipment, according to an embodiment.

Referring to FIG. 7, the yield prediction method according to an embodiment may include operation S200 of receiving wafer level data, operation S210 of generating a plurality of virtual chips, operation S220 of mapping a test result to the plurality of virtual chips, operation S230 of receiving the positions of fixed areas of equipment with respect to a semiconductor wafer, operation S240 of transforming a coordinate system of the plurality of virtual chips, operation S250 of computing a defect rate (or a killing ratio), and operation S260 of computing a defect index. In the description of operations S200, S210, S220, S250, and S260, a description made above with reference to FIG. 2 is not particularly repeated.

In some embodiments, to perform a particular process of semiconductor process equipment, a semiconductor wafer may be in contact with particular fixed areas of the semiconductor process equipment. In operation S230, the yield prediction apparatus 100 may receive the positions of the particular fixed areas of the semiconductor process equipment. As described above with reference to FIG. 3, a coordinate system based on a grid may be set for a plurality of virtual chips, and the coordinate system may not match a coordinate system used in process equipment to indicate positions. Therefore, in operation S240, the yield prediction apparatus 100 may transform the coordinate system of the plurality of virtual chips to match the coordinate systems to each other. For example, the plurality of virtual chips may be represented by rectangular coordinates based on a grid, and a position in the process equipment may be represented by polar coordinates based on a radius and an angle. Therefore, the yield prediction apparatus 100 may perform coordinate transformation as to be described below with reference to FIG. 8. The yield prediction apparatus 100 may determine an influence due to particular fixed areas of the process equipment based on this coordinate transformation, where a coordinate system of the plurality of virtual chips can be transformed to match the transformed coordinate system to a coordinate system of the fixed areas. The yield prediction apparatus 100 may determine, through coordinate transformation, areas on a semiconductor wafer effected by components of equipment. The yield prediction apparatus 100 may identify virtual chips corresponding to particular fixed areas of equipment through coordinate transformation and compute defect rates of the virtual chips based on mapping a test result to defect data obtained from wafer level data in operation S250. The virtual chip can overlap with the fixed area including defects.

In operation S260, the yield prediction apparatus 100 may compute a defect index for each piece of equipment based on the defect rates, as shown in Equation 3, which will be described later, to predict the yield for each piece of equipment.

As a result, defects may occur on particular areas on a semiconductor wafer, i.e., particular fixed chips included in the semiconductor wafer, due to particular process equipment, and according to the yield prediction method of an embodiment, a correlation between the defects occurring on such fixed chips for each piece of process equipment and a chip defect rate may be determined.

In addition, according to the yield prediction method, an influence on yield due to defects of fixed areas corresponding to particular equipment may be determined, the yield for each piece of process equipment may be predicted, and furthermore, the yield prediction method may contribute to improving semiconductor yield, quality, and productivity. A defect rate of each of the plurality of virtual chips overlapping the fixed areas can be computed according to defects based on a result of a mapping of test results to the plurality of virtual chips. The yield prediction apparatus 100 may predict the yield of fixed areas corresponding to semiconductor equipment based on preprocessed data.

Figure 8:
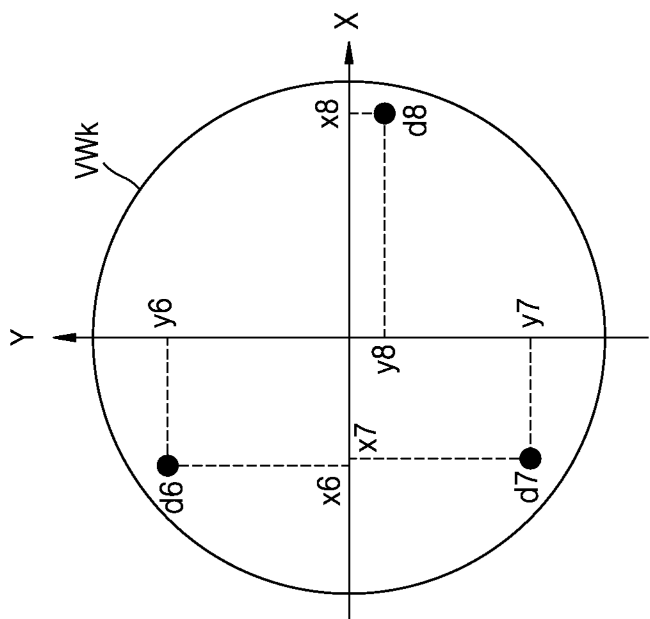
FIG. 8 illustrates coordinate transformation, according to an embodiment.

FIG. 8 illustrates coordinate transformation according to an embodiment.

Referring to FIG. 8, the yield prediction apparatus 100 may transform rectangular coordinates into polar coordinates to match a grid-based coordinate system for a plurality of virtual chips to a coordinate system indicating positions on process equipment.

In some embodiments, the virtual wafer VWk may include defects d6, d7, and d8 causing a bad chip (e.g., local defocus) in corresponding fixed areas of particular equipment. For example, the defect d6 may be represented as (x6, y6) based on rectangular coordinates according to the first direction X and the second direction Y perpendicular to the first direction X. Likewise, the defect d7 may be represented as (x7, y7) and the defect d8 may be represented as (x8, y8). The yield prediction apparatus 100 may transform rectangular coordinates in a coordinate system for a virtual chip into polar coordinates. By doing this, the position of the defect d6 may be represented as (r1, θ1), the position of the defect d7 may be represented as (r2, θ2), and the position of the defect d8 may be represented as (r3, θ3). As a result, the yield prediction apparatus 100 may transform rectangular coordinates generated from the wafer level data WLDk into polar coordinates of which the radius is a distance from the center of the virtual wafer VWk to an edge of the virtual wafer VWk.

Figure 9A:
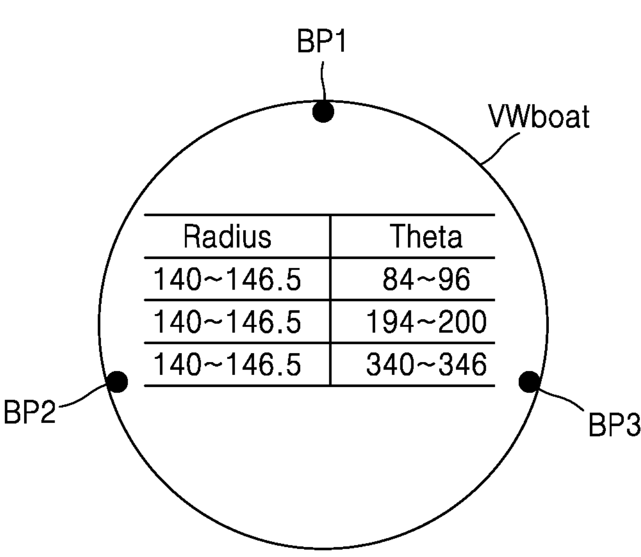
FIGS. 9A and 9B illustrate a fixed area database of equipment, according to an embodiment.
Figure 9B:
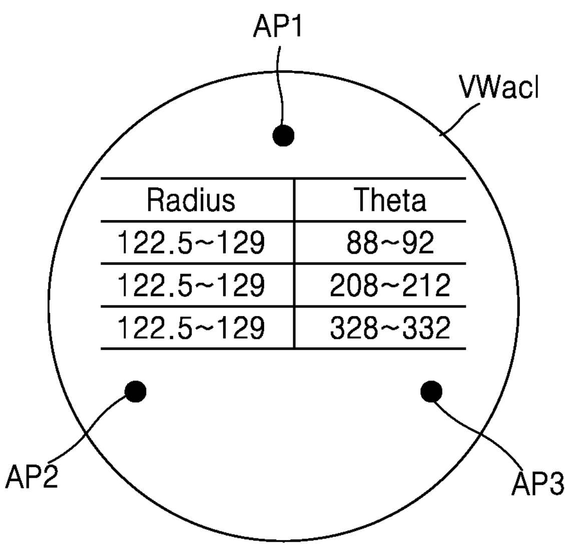

FIGS. 9A and 9B illustrate a fixed area database of equipment, according to an embodiment.

Referring to FIGS. 9A and 9B, the yield prediction apparatus 100 may receive the positions of fixed areas on a semiconductor wafer, which correspond to particular process equipment, from the fixed area database.

In an embodiment, FIG. 9A shows fixed areas by a wafer boat for loading a semiconductor wafer. A virtual wafer VWboat may include boat points, e.g., first to third boat points BP1 to BP3, in contact with a wafer support portion of the wafer boat. As described above, defects may occur due to the first to third boat points BP1 to BP3, in particular fixed areas of the equipment, i.e., the wafer boat. The first boat point BP1 may be represented as polar coordinates of (140 to 146.5, 84 to 86), and coordinate values may respectively have, for example, units of millimeter (mm) and angle (°). Likewise, the second boat point BP2 may be represented as (140 to 146.5, 194 to 200) and the third boat point BP3 may be represented as (140 to 146.5, 340 to 346). That is, the first to third boat points BP1 to BP3 may be points on a circle, which have the same radius. That is, the yield prediction apparatus 100 may receive the positions of the first to third boat points BP1 to BP3 from the fixed area database and determine defect rates of a plurality of virtual chips corresponding to the received positions by performing matching through coordinate transformation, thereby determining defects which may occur due to the first to third boat points BP1 to BP3, i.e., an influence of particular equipment on a semiconductor yield.

In another embodiment, FIG. 9B shows fixed areas by lift pins during an amorphous carbon layer (ACL) process. A semiconductor wafer VWac1 may include ACL points, e.g., first to third ACL points AP1 to AP3, in contact with the lift pins, and defects may occur due to particular fixed areas, i.e., the first to third ACL points AP1 to AP3, of equipment. The first ACL point AP1 may be represented as polar coordinates of (122.5 to 129, 88 to 92), and coordinate values may respectively have, for example, units of mm and °. Likewise, the second ACL point AP2 may be represented as (122.5 to 129, 208 to 212) and the third ACL point AP3 may be represented as (122.5 to 129, 328 to 332). That is, the first to third ACL points AP1 to AP3 may be points on the same circle. The yield prediction apparatus 100 may receive the positions of the first to third ACL points AP1 to AP3 from the fixed area database and determine defect rates of a plurality of virtual chips corresponding to the received positions by performing matching through coordinate transformation, thereby determining defects which may occur due to the first to third ACL points AP1 to AP3, i.e., an influence of particular equipment on a semiconductor yield.

Such fixed areas by equipment configured to perform a particular role may be referred to as a Rule. For example, the fixed areas by a wafer boat may be classified as Rule 1 and the fixed areas by ACL lift pins may be classified as Rule 2. That is, a set of fixed areas for each piece of equipment may correspond to Rule n (n is a natural number greater than or equal to 1), and the yield prediction apparatus 100 may predict the yield for each piece of equipment by receiving the positions of fixed areas from a rule database.

As a result, the yield prediction apparatus 100 may compute a defect index for each piece of equipment by Equation 3 below based on the defect index computation method described above.

$$\text{Defect index} = \frac{\sum_{\substack{a\in\Omega \\ s\in\Gamma}} K(\text{Max}_{x\in a}(m_s(x)))}{\text{Production of equipment}} \quad \text{[Equation 3]}$$

where a denotes the chip positioned in the wafer Ω, K(y) denotes a defect rate of the defect y obtained from wafer level data (i.e., computed based on mapping), $\text{Max}_{x\in a}(m_s(x))$ denotes the size of the defect y positioned at the position x in the chip a, and s denotes a particular rule among all process steps Γ.

That is, according to the yield prediction method according to an embodiment, a defect index for each piece of equipment may be computed for a plurality of pieces of equipment corresponding to rules, and thus, equipment of which improvement is needed in a FAB operation may be early detected and furthermore, yield and productivity may be effectively improved through improvement of corresponding equipment.

Figure 10:
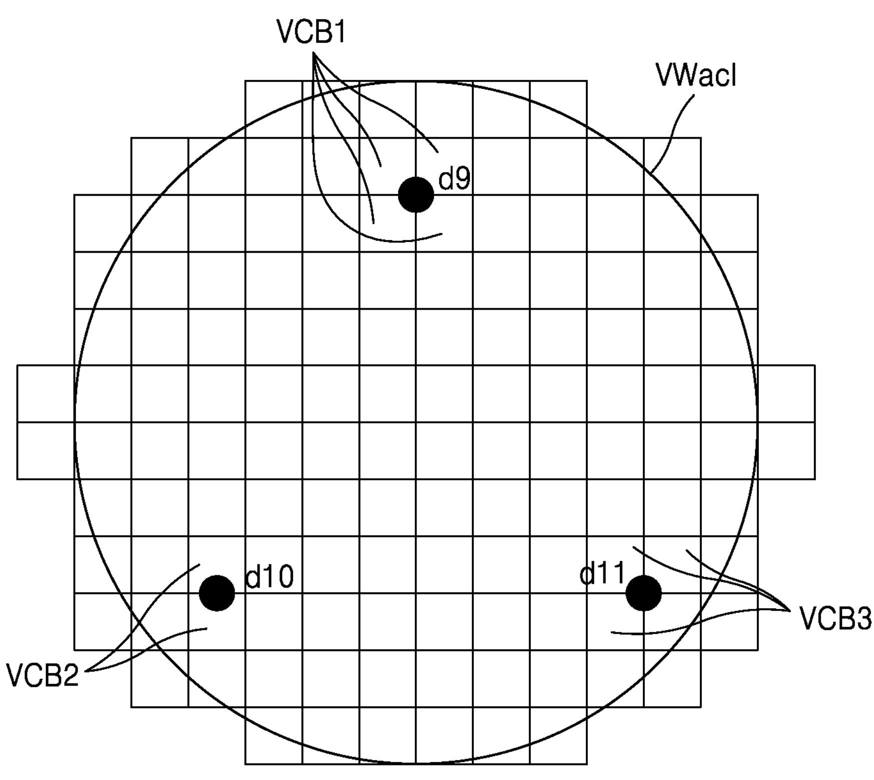
FIG. 10 illustrates virtual chips including defect data corresponding to fixed areas of equipment, according to an embodiment.

FIG. 10 illustrates virtual chips including defect data corresponding to fixed areas of equipment, according to an embodiment.

Referring to FIGS. 9B and 10, defects d9 to d11 by the fixed areas corresponding to the ACL lift pins are shown on the virtual wafer VWac1. As described above, the yield prediction apparatus 100 may receive information about fixed areas from the rule database, identify a plurality of virtual chip blocks, e.g., first to third virtual chip blocks VCB1 to VCB3, corresponding to the fixed areas, and compute defect rates according to defects occurring on the fixed areas. In detail, the yield prediction apparatus 100 may obtain, from wafer level data, information about defects included in the first to third virtual chip blocks VCB1 to VCB3 corresponding to the fixed areas. For example, the defects d9 to d11 may be defects occurring due to the ACL lift pins and influence a single chip or a plurality of chips.

For example, a plurality of virtual chips may be included in the first virtual chip block VCB1 corresponding to the first ACL point AP1 that is a fixed area. The defect d9 may occur due to a contact with a pin or the like and influence four virtual chips included in the first virtual chip block VCB1. Therefore, to determine a defect rate according to the defect d9 occurring by the first ACL point AP1, the defect rate computation described above may be performed for the four virtual chips including the defect d9. In addition, for example, a plurality of virtual chips may be included in the second virtual chip block VCB2 corresponding to the second ACL point AP2 that is a fixed area. The defect d10 may occur due to a contact with a pin or the like and influence two virtual chips included in the second virtual chip block VCB2. Therefore, to determine a defect rate according to the defect d10 occurring by the second ACL point AP2, the defect rate computation described above may be performed for the two virtual chips including the defect d10. Likewise, a plurality of virtual chips may also be included in the third virtual chip block VCB3 corresponding to the third ACL point AP3, and the defect d11 occurring by a contact with a pin or the like may influence three virtual chips included in the third virtual chip block VCB3. Therefore, to determine a defect rate by the third ACL point AP3, the defect rate computation described above may be performed for the three virtual chips including the defect d11.

As described above, the yield prediction apparatus 100 may determine defect rates according to defects for virtual chips corresponding to fixed areas to determine an influence of defects by fixed areas of particular equipment, which is exerted to yield. Furthermore, based on the determined defect rates, the yield prediction apparatus 100 may predict a yield for each piece of process equipment.

Figure 11:
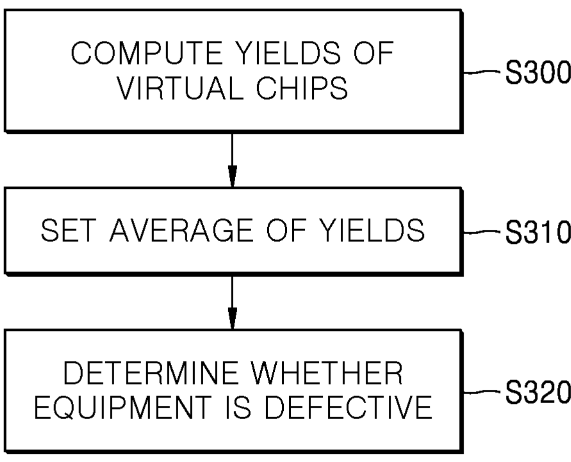
FIG. 11 is a flowchart illustrating a method of determining whether equipment is defective, according to an embodiment.

FIG. 11 is a flowchart illustrating a method of determining whether equipment is defective, according to an embodiment.

Referring to FIGS. 10 and 11, the method of determining whether process equipment is defective, according to an embodiment, may include operation S300 of computing the yield of each of virtual chips corresponding to fixed areas, operation S310 of setting an average of computed yields, and operation S320 of determining whether each piece of equipment is defective. As described above with reference to FIG. 10, the yield prediction apparatus 100 may identify corresponding virtual chips based on the positions of fixed areas of equipment (i.e., virtual chips influenced from the fixed areas). For example, virtual chips influenced by fixed areas of ACL lift pins may be virtual chips (hereinafter, target virtual chips) included in the first virtual chip block VCB1 to the third virtual chip block VCB3. In operation S300, the yield prediction apparatus 100 may compute yields of target virtual chips to determine whether particular equipment is defective.

In more detail, there may be a plurality of pieces of equipment configured to perform a particular process, and for example, the number of pieces of equipment configured to perform an ACL process may be N (N is a natural number greater than or equal to 2). The N pieces of equipment may correspond to Rule 2 as described above with reference to FIG. 9B. The yield prediction apparatus 100 may compute the yield of each of the N pieces of equipment based on fixed areas corresponding to Rule 2. As a result that one (e.g., equipment A) of the N pieces of equipment has performed an ACL process on a plurality of semiconductor wafers, the yields of the target virtual chips may be computed. For example, a percentage of chips which has not been determined to be defective among the target virtual chips on which a process has been performed by the equipment A may be 60%, and in this case, the yield of the equipment A may be 0.6. However, the inventive concept is not limited to the present embodiment. That is, each of the N pieces of equipment, including the equipment A, may have a unique yield, and the yield may be variously implemented.

In some embodiments, the yield prediction apparatus 100 may set an average based on yields of all or some of the N pieces of equipment, which were computed as described above, in operation S310. In some embodiments, as to be described below with reference to FIG. 12, the average may be computed by using only some of the yields of the N pieces of equipment to effectively detect bad equipment, and while progressively determining whether each of the N pieces of equipment is defective, a computed average may vary. The setting of the average can include computing the average based on yields obtained by excluding a first yield having the lowest value and a second yield having the second lowest value among the yields of the plurality of pieces of equipment. It may be determined that equipment corresponding to the first yield is bad equipment if a ratio of a first deviation to a second deviation is greater than or equal to a reference value.

In some embodiments, the yield prediction apparatus 100 may determine whether target equipment is defective, based on the computed average in operation S320. As to be described below with reference to FIG. 12, the yield prediction apparatus 100 may determine that target equipment is defective if a certain percentage based on a yield of the target equipment does not satisfy a reference value. The yield prediction apparatus 100 may perform the defect determination described above for all rule data.

As a result, according to the yield prediction method according to an embodiment, bad equipment among a plurality of pieces of equipment configured to perform the same process may be early detected, and a yield of the bad equipment and a yield decrease due to the bad equipment may be predicted. That is, pieces of equipment (i.e., fixed areas) may be monitored, and equipment for which improvement is needed may be early detected through the monitoring, and thus, a yield and productivity may be effectively improved through improvement in a FAB operation.

In addition, a deviation in improvement according to a user's competence may be reduced through monitoring of pieces of equipment and automatic control of bad equipment based on the monitoring.

Figure 12:
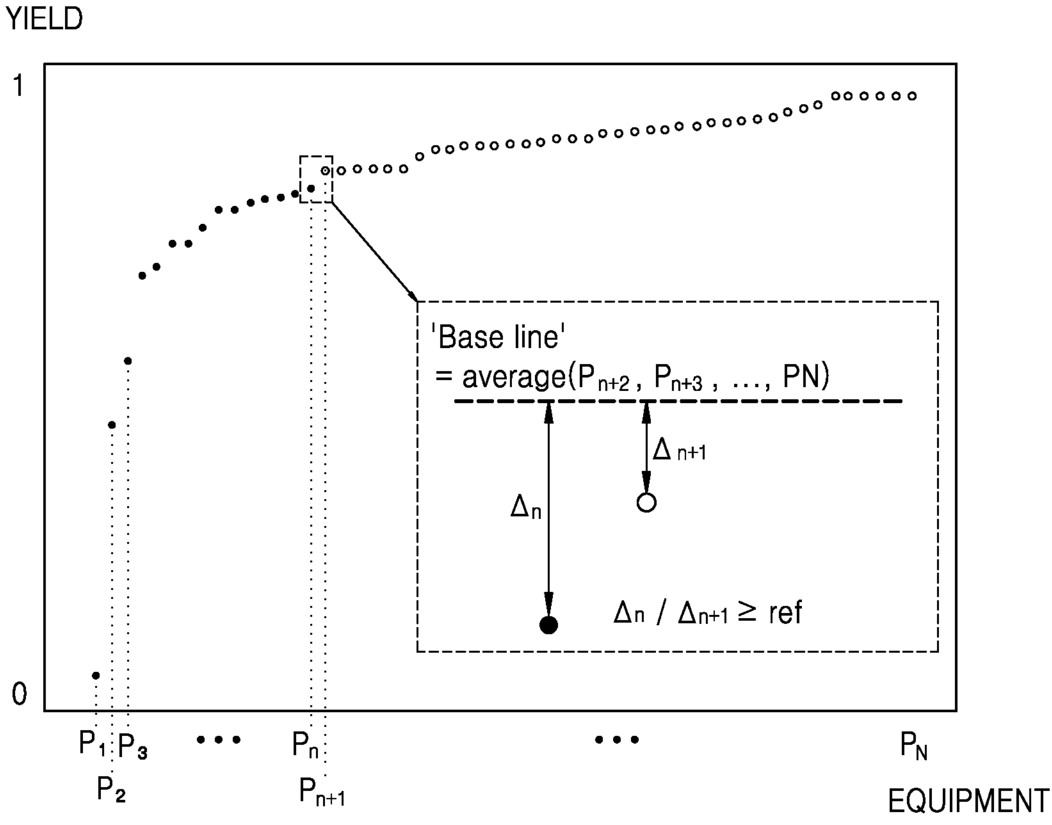
FIG. 12 is a graph showing a process of determining whether equipment is defective, according to an embodiment.

FIG. 12 is a graph showing a process of determining whether equipment is defective, according to an embodiment.

Referring to FIGS. 11 and 12, the yield prediction apparatus 100 may set an average (or referred to as a base line) to determine whether each of the N pieces of equipment is defective. Particularly, the yield prediction apparatus 100 may first sort the N pieces of equipment. In some embodiments, each of the N pieces of equipment may have a unique yield, and the N pieces of equipment may be sorted in an ascending order based on the unique yield. For example, 0.6 that is the yield of the equipment A described above with reference to FIG. 11 may be the lowest yield among the yields of the N pieces of equipment, and in this case, the equipment A may be positioned at the first place in the ascending order. In addition, in an embodiment, yields of equipment B, equipment C, and equipment D may be 0.85, 0.75, and 1, respectively. The yield of the equipment C may be the second lowest yield, and in this case, the equipment C may be positioned at the second place in the ascending order. The yield of the equipment B may be the third lowest yield, and in this case, the equipment B may be positioned at the third place in the ascending order. The yield of the equipment D may be the highest yield, and in this case, the equipment D may be positioned at the last place in the ascending order, where equipment B is between equipment C and equipment D. When the N pieces of equipment are sorted as described above, the N pieces of equipment may be referred to as first equipment $P_1$, second equipment $P_2$, . . . , and Nth equipment $P_N$ in the ascending order, respectively. Herein, the first equipment $P_1$ may be the equipment A, the second equipment $P_2$ may be the equipment C, the third equipment $P_3$ may be the equipment B, and the Nth equipment $P_N$ may be the equipment D. That is, the N pieces of equipment may be sorted in an order of bad equipment having a lower yield.

In some embodiments, the yield prediction apparatus 100 may first determine whether the first equipment $P_1$ (i.e., target equipment) having the lowest yield is defective, to effectively determine whether each of the N pieces of equipment is defective. For example, the yield prediction apparatus 100 may set, as the average, a first average of yields except for the yields of the first equipment $P_1$ and the second equipment $P_2$. In other words, because the N pieces of equipment are sorted in an ascending order based on a yield, if the yield of the first equipment $P_1$ that is relatively most defective among the N pieces of equipment and the yield of the second equipment $P_2$ for which deviation ratio comparison is to be performed are reflected to the average, the average is lowered so that effective selection may not be possible, and thus, the average may be set based on the setting scheme described above.

In some embodiments, based on the set first average, the yield prediction apparatus 100 may compute a first deviation $\Delta_1$ that is a deviation between the first average and the yield of the first equipment $P_1$ and a second deviation $\Delta_2$ that is a deviation between the first average and the yield of the second equipment $P_2$. A first deviation and a second deviation that are deviations between the average and the first and second yields can be computed, respectively. Thereafter, the yield prediction apparatus 100 may compute a ratio of the first deviation $\Delta_1$ to the second deviation $\Delta_2$ and compare the computed ratio to a reference value ref. In some embodiments, the reference value, Ref, may be set to an arbitrary value by an external control. If the ratio is greater than the reference value ref, the yield prediction apparatus 100 may determine that the first equipment $P_1$ that is the target equipment is bad equipment. That is, a large deviation ratio compared to the first average obtained by excluding the first equipment $P_1$ that is relatively defective and the second equipment $P_2$ to be compared with the first equipment P1 indicates that the number of bad chips according to defects is larger compared to the other pieces of equipment, and thus, the first equipment $P_1$ may be determined as bad equipment. Therefore, equipment corresponding to the first yield can be determined to be bad equipment if the ratio of a first deviation to a second deviation is greater than or equal to the reference value.

Next, the yield prediction apparatus 100 may determine whether the second equipment $P_2$ (i.e., target equipment) having the lowest yield among the N−1 pieces of equipment excluding the first equipment $P_1$ determined as bad equipment is defective. The yield prediction apparatus 100 may set, as the average, a second average of the yields of the N−3 pieces of equipment except for the yields of the second equipment $P_2$ and the third equipment $P_3$. Based on the set second average, the yield prediction apparatus 100 may compute a third deviation $\Delta_3$ that is a deviation between the second average and the yield of the second equipment $P_2$ and a fourth deviation $\Delta_4$ that is a deviation between the second average and the yield of the third equipment $P_3$. If a ratio of the third deviation $\Delta_3$ to the fourth deviation $\Delta_4$ is greater than the reference value ref, the yield prediction apparatus 100 may determine that the second equipment $P_2$ that is the target equipment is bad equipment. Likewise, the defect determination process may be repeated up to nth equipment $P_n$. The yield prediction apparatus 100 may determine whether the nth equipment $P_n$ having the lowest yield among pieces of equipment excluding n−1 pieces of equipment determined as bad equipment is defective. The yield prediction apparatus 100 may set, as the average, an nth average of the yields of the pieces of equipment except for the yields of the nth equipment $P_n$ and (n+1)th equipment $P_{n+1}$. Based on the set nth average, the yield prediction apparatus 100 may compute an nth deviation $\Delta_n$ that is a deviation between the nth average and the yield of the nth equipment $P_n$ and an (n+1)th deviation $\Delta_{n+1}$ that is a deviation between the nth average and the yield of the (n+1)th equipment $P_{n+1}$. If a ratio of the nth deviation $\Delta_n$ to the (n+1)th deviation $\Delta_{n+1}$ is greater than the reference value ref, the yield prediction apparatus 100 may determine that the nth equipment $P_n$ that is the target equipment is bad equipment. For example, when it is determined in the same manner whether the (n+1)th equipment $P_{n+1}$ is defective, the (n+1)th equipment $P_{n+1}$ may be determined as good equipment. In some embodiments, each of the other pieces of equipment having a higher yield than the yield of the (n+1)th equipment $P_{n+1}$ determined as good equipment may be good equipment, and thus, the yield prediction apparatus 100 may determine that the other pieces of equipment are all good equipment. As described above, the yield prediction apparatus 100 may perform the defect determination operation not only for Rule 2 but also for all rule data.

As a result, the yield prediction apparatus 100 according to an embodiment may select bad equipment among a plurality of pieces of equipment through a defect determination algorithm and automate a determination process. Furthermore, with respect to pieces of equipment determined as bad equipment, a defect index for each piece of equipment, which has been described above, may be computed, and thus, yield reduction due to bad equipment and a rete of the yield reduction may be predicted for all wafers.

Figure 13:
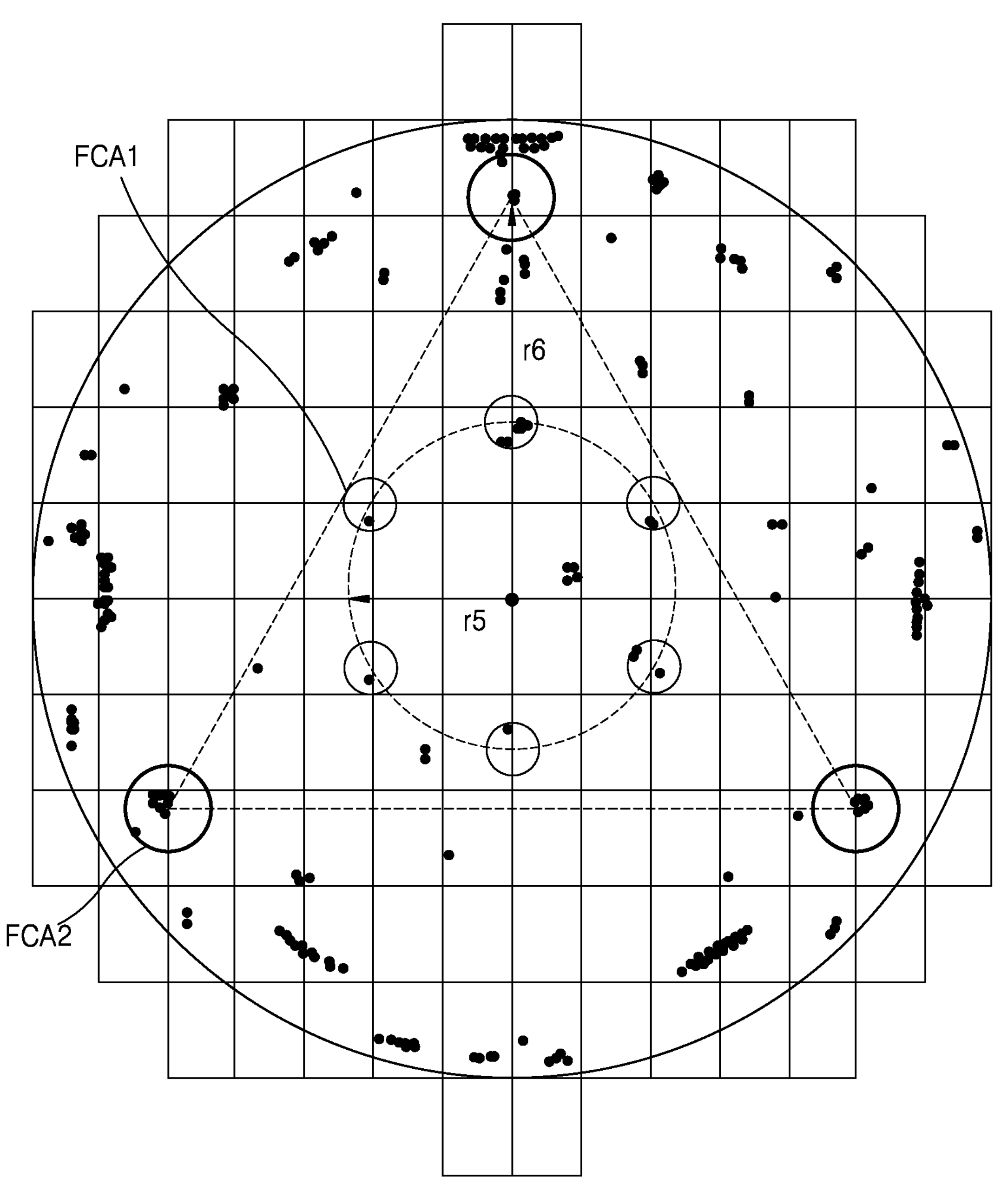
FIG. 13 illustrates predicting yield through defect detection of a wafer, according to an embodiment.

FIG. 13 illustrates predicting yield through defect detection of a wafer, according to an embodiment.

Referring to FIGS. 10 and 13, a plurality of virtual chips may include a first fixed chip area FCA1 and a second fixed chip area FCA2. For example, the yield prediction apparatus 100 may receive information about the first fixed chip area FCA1 from a rule database. Rule data corresponding to the first fixed chip area FCA1 may be data of fixed areas by lift pins for performing a spin on hardmask (SOH) process. The first fixed chip area FCA1 may include six fixed areas and be implemented by a circular shape with a radius of r5 as shown in FIG. 13. Defects may be included in the six fixed areas as shown in FIG. 13. In addition, for example, the yield prediction apparatus 100 may receive information about the second fixed chip area FCA2 from the rule database, and rule data corresponding to the second fixed chip area FCA2 may be data of fixed areas by lift pins for performing an ACL process. As shown in FIG. 13, the second fixed chip area FCA2 may include three fixed areas in a triangular shape with r6 that is a distance between the center thereof and each vertex. Defects may be included in the three fixed areas as shown in FIG. 13.

The yield prediction apparatus 100 may compute defect rates due to defects included in virtual chips corresponding to the first fixed chip area FCA1 or the second fixed chip area FCA2 to compute a defect index of particular equipment due to fixed areas, i.e., a defect index for each piece of equipment. In addition, the yield prediction apparatus 100 may select pieces of bad equipment among pieces of equipment configured to perform a process corresponding to the first fixed chip area FCA1 or the second fixed chip area FCA2 (e.g., an SOH process or an ACL process) and also predict yield reduction and a rate of the yield reduction through computation of defect indices of the pieces of bad equipment.

Figure 14:
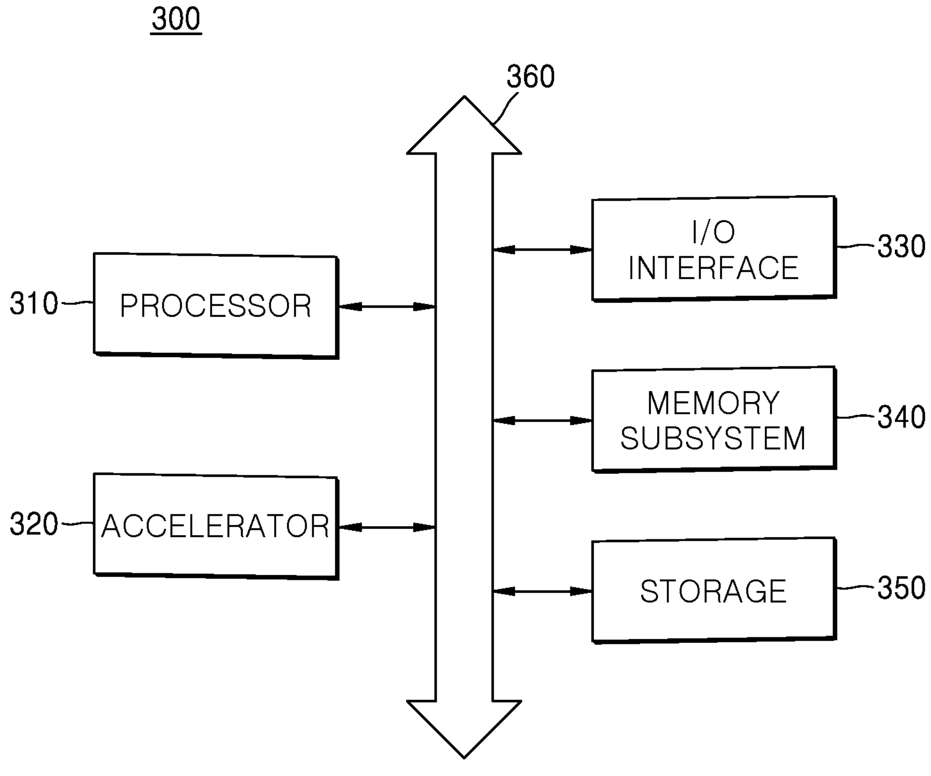
FIG. 14 is a block diagram illustrating a yield prediction system according to an embodiment.

FIG. 14 is a block diagram illustrating a yield prediction system 300 according to an embodiment.

Referring to FIG. 14, the yield prediction system 300 may include a processor 310, an accelerator 320, an input/output interface 330, a memory subsystem 340, a storage 350, and a bus 360. The processor 310 and the memory subsystem 340 of FIG. 14 may correspond to the processor 110 and the memory 120 of FIG. 1, respectively, and a description made with reference to FIG. 1 is not repeated herein.

The processor 310, the accelerator 320, the input/output interface 330, the memory subsystem 340, and the storage 350 may communicate with each other via the bus 360. In some embodiments, the yield prediction system 300 may be a system on chip (SoC) in which components are implemented in one chip, and the storage 350 may be outside the SoC. In some embodiments, at least one of the components shown in FIG. 14 may be omitted from the yield prediction system 300.

The processor 310 may control the operations described above with reference to the drawings in a top layer for the yield prediction system 300 and control the other components of the yield prediction system 300.

In some embodiments, the processor 310 may include two or more processing cores. As described above with reference to the drawings, the processor 310 may process various kinds of operations required for an operation of the yield prediction system 300 to compute a defect index for yield prediction through preprocessing of wafer level data.

The accelerator 320 may be designed to perform a designated function at a high speed. For example, the accelerator 320 may provide, to the memory subsystem 340, data generated by processing data received from the memory subsystem 340.

The input/output interface 330 may provide an interface configured to receive an input from the outside of the yield prediction system 300 and provide an output to the outside of the yield prediction system 300. For example, the yield prediction system 300 may receive wafer level data and an EDS test result from the outside via the input/output interface 330. In addition, via the input/output interface 330, the yield prediction system 300 may receive rule data from the outside and receive a reference value of a deviation ratio for determining whether equipment is defective. However, the inventive concept is not limited thereto. For example, various data as described above may be provided from the yield prediction system 300.

The memory subsystem 340 may be accessed by other components connected to the bus 360. In some embodiments, the memory subsystem 340 may include a volatile memory, such as DRAM or SRAM, or a nonvolatile memory, such as flash memory or resistive random access memory (RRAM). In addition, in some embodiments, the memory subsystem 340 may provide an interface for the storage 350. The storage 350 may be a storage medium which does not lose data even when power is cut off. For example, the storage 350 may include a semiconductor memory device, such as a nonvolatile memory, or a random storage medium, such as a magnetic card/disk or an optical card/disc. In some embodiments, wafer level data and/or an EDS test result may be stored in the memory subsystem 340 or the storage 350. In addition, in some embodiments, various data to be reflected to the virtual wafer VWk and a plurality of virtual chips corresponding to the semiconductor wafer Wk and the aforementioned various data required for yield prediction may be stored in the memory subsystem 340 or the storage 350.

The bus 360 may operate based on one of various bus protocols. The various bus protocols may include at least one of an advanced microcontroller bus architecture (AMBA) protocol, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a mobile industry processor interface (MIPI) protocol, a universal flash storage (UFS) protocol, and the like.

While the inventive concept has been particularly shown and described with reference to embodiments thereof, it will be understood that various changes in form and details may be made therein without departing from the spirit and scope of the following claims.

What is claimed is:

1. A method of predicting a semiconductor yield by a processor, the method comprising:

receiving wafer level data generated by measuring a plurality of wafers;

generating a plurality of virtual chips corresponding to real chips of the plurality of wafers based on the wafer level data;

mapping a test result of the plurality of wafers to the plurality of virtual chips;

computing a defect rate of the plurality of virtual chips according to defects based on a result of the mapping; and computing a defect index based on the defect rate, wherein the computing of the defect rate comprises computing the defect rate for each defect included in each of the plurality of virtual chips, wherein the defect having a greatest size among at least one defect included in each of the plurality of virtual chips is used for the computation.

2. The method of claim 1, wherein the generating of the plurality of virtual chips comprises:

generating a grid based on sizes of the real chips of the plurality of wafers; and setting rectangular coordinates based on the grid.

3. The method of claim 1, wherein the wafer level data is measured for each process step for each of the plurality of wafers and includes information about the process step.

4. The method of claim 3, wherein the defect index is computed for each process step based on the information about the process step.

5. The method of claim 1, wherein the test result further includes information about defect types of the real chips of the plurality of wafers.

6. The method of claim 1, wherein the computing of the defect rate comprises fitting the defect rate, wherein the greater the size of the defect, the greater the defect rate.

7. A method of predicting a semiconductor yield by a processor, the method comprising:

receiving wafer level data generated by measuring each of a plurality of wafers;

generating a plurality of virtual chips corresponding to real chips of each of the plurality of wafers based on the wafer level data;

mapping a test result of each of the plurality of wafers to the plurality of virtual chips;

receiving fixed areas of equipment;

transforming a coordinate system of the plurality of virtual chips to match the transformed coordinate system to a coordinate system of the fixed areas;

computing a defect rate of each of the plurality of virtual chips overlapping the fixed areas, according to defects based on a result of the mapping; and computing a defect index of the equipment based on the defect rate, wherein the computing of the defect rate comprises computing the defect rate for each defect included in each of the plurality of virtual chips, wherein the defect having a greatest size among at least one defect included in each of the plurality of virtual chips is used for the computation.

8. The method of claim 7, wherein the generating of the plurality of virtual chips comprises:

generating a grid based on sizes of the real chips of each of the plurality of wafers; and setting rectangular coordinates based on the grid.

9. The method of claim 8, wherein the matching of the transformed coordinate system to the coordinate system of the fixed areas comprises transforming the rectangular coordinates of the plurality of virtual chips into polar coordinates.

10. The method of claim 7, further comprising determining whether a plurality of pieces of equipment comprising the equipment are defective, wherein the determining of whether the plurality of pieces of equipment comprising the equipment are defective comprises:

computing a yield of the plurality of virtual chips overlapping the fixed areas for each of the plurality of pieces of equipment;

setting an average of the yields of the plurality of pieces of equipment; and determining whether each of the plurality of pieces of equipment is defective, based on a deviation between the average and the yield of each of the plurality of pieces of equipment.

11. The method of claim 10, wherein the setting of the average comprises computing the average based on yields obtained by excluding a first yield having a lowest value and a second yield having a second lowest value among the yields of the plurality of pieces of equipment.

12. The method of claim 11, wherein the determining of whether each of the plurality of pieces of equipment is defective comprises:

computing a first deviation and a second deviation that are deviations between the average and the first and second yields, respectively; and determining that equipment corresponding to the first yield is bad equipment if a ratio of the first deviation to the second deviation is greater than or equal to a reference value.

13. The method of claim 7, wherein the test result further includes information about defect types of the real chips of each of the plurality of wafers.

14. The method of claim 7, wherein the computing of the defect rate comprises fitting the defect rate such that the greater the size of the defect, the greater the defect rate.

15. An apparatus comprising:

a memory in which a program for predicting a semiconductor yield is stored; and a processor configured to execute the program stored in the memory, wherein the processor is further configured to receive wafer level data generated by measuring each of a plurality of wafers, generate a plurality of virtual chips corresponding to real chips of each of the plurality of wafers based on the wafer level data, map a test result of each of the plurality of wafers to the plurality of virtual chips, compute a defect rate of each of the plurality of virtual chips according to defects based on a result of the mapping, and compute a defect index based on the defect rate, wherein the processor is further configured to compute the defect rate for each defect included in each of the plurality of virtual chips, wherein the defect having a greatest size among at least one defect included in each of the plurality of virtual chips is used for the computation.

16. The apparatus of claim 15, wherein the processor is further configured to receive fixed areas of equipment, transform a coordinate system of the plurality of virtual chips to match the transformed coordinate system to a coordinate system of the fixed areas, compute a defect rate of each of the plurality of virtual chips overlapping the fixed areas, according to defects based on a result of the mapping, and compute a defect index of the equipment based on the defect rate.

17. The apparatus of claim 16, wherein the processor is further configured to compute a yield of the plurality of virtual chips overlapping the fixed areas for each of a plurality of pieces of equipment, set an average of the yields of the plurality of pieces of equipment, and determine whether each of the plurality of pieces of equipment is defective, based on a deviation between the average and the yield of each of the plurality of pieces of equipment.

18. The apparatus of claim 17, wherein the processor is further configured to compute the average based on yields obtained by excluding a first yield having a lowest value and a second yield having a second lowest value among the yields of the plurality of pieces of equipment.

* * * * *